(12) United States Patent
Guyan

(10) Patent No.: US 10,039,343 B2
(45) Date of Patent: Aug. 7, 2018

(54) FOOTWEAR INCLUDING SOLE ASSEMBLY

(71) Applicant: Under Armour, Inc., Baltimore, MD (US)

(72) Inventor: Alan Guyan, Baltimore, MD (US)

(73) Assignee: UNDER ARMOUR, INC., Baltimore, MD (US)

(*) Notice: Subject to any disclaimer, the term of this patent is extended or adjusted under 35 U.S.C. 154(b) by 41 days.

(21) Appl. No.: 15/149,661

(22) Filed: May 9, 2016

(65) Prior Publication Data

US 2016/0360828 A1    Dec. 15, 2016

Related U.S. Application Data

(60) Provisional application No. 62/294,043, filed on Feb. 11, 2016, provisional application No. 62/158,950, filed on May 8, 2015.

(51) Int. Cl.

| A43B 13/18 | (2006.01) |
|---|---|
| A43B 13/12 | (2006.01) |
| A43B 13/04 | (2006.01) |
| A43B 13/14 | (2006.01) |
| A43B 3/00 | (2006.01) |

(52) U.S. Cl.
CPC .......... *A43B 13/181* (2013.01); *A43B 3/0005* (2013.01); *A43B 13/04* (2013.01); *A43B 13/12* (2013.01); *A43B 13/141* (2013.01); *A43B 13/187* (2013.01)

(58) Field of Classification Search
CPC ....... A43B 13/14; A43B 13/181; A43B 13/20; A43B 13/16

USPC ........................................................... 36/29
See application file for complete search history.

(56) References Cited

U.S. PATENT DOCUMENTS

| 1,800,406 | A | | 4/1931 | De Blois Rice |
|---|---|---|---|---|
| 3,469,576 | A | | 9/1969 | Smith et al. |
| 4,168,341 | A | | 9/1979 | Siedenstrang et al. |
| 4,170,078 | A | | 10/1979 | Moss |
| 4,245,406 | A | | 1/1981 | Landay et al. |
| 4,297,796 | A | * | 11/1981 | Stirtz ............... A43B 13/18 36/28 |
| 4,316,335 | A | | 2/1982 | Giese et al. |

(Continued)

FOREIGN PATENT DOCUMENTS

| AU | 2008207351 | 3/2009 |
|---|---|---|
| CN | 1190560 | 8/1998 |

(Continued)

*Primary Examiner* — Ted Kavanaugh
(74) *Attorney, Agent, or Firm* — Edell, Shapiro & Finnan, LLC

(57) ABSTRACT

An article of footwear includes an upper and a sole assembly. The sole assembly includes a unitary, open-celled structure. Specifically, the sole assembly includes a lattice structure having an interconnected network of struts and nodes that cooperate to define voids. The struts and nodes are configured to generate predetermined support and flexure properties within the network. The lattice may be configured as a conformal lattice, being contoured to receive accessories or complementary support structures. The sole assembly may further include an insert formed of compression material (e.g., foam). In operation, the lattice and foam insert cooperate to provide stability and cushioning to the article of footwear.

19 Claims, 20 Drawing Sheets

(56) References Cited

U.S. PATENT DOCUMENTS

| | | |
|---|---|---|
| 4,535,553 A | 8/1985 | Derderian et al. |
| 4,546,556 A | 10/1985 | Stubblefield |
| 4,594,799 A | 6/1986 | Lin |
| 4,598,487 A | 7/1986 | Misevich |
| 4,663,865 A | 5/1987 | Telecemian |
| 4,769,927 A | 9/1988 | Liggett et al. |
| 4,845,863 A | 7/1989 | Yung-Mao |
| 4,854,055 A | 8/1989 | Sugiyama |
| 4,863,538 A | 9/1989 | Deckard |
| 4,864,738 A | 9/1989 | Horovitz |
| 4,938,816 A | 7/1990 | Beaman et al. |
| 5,005,575 A | 4/1991 | Geri |
| 5,022,168 A | 6/1991 | Jeppson, III et al. |
| 5,117,566 A | 6/1992 | Lloyd |
| 5,156,697 A | 10/1992 | Bourell et al. |
| 5,218,773 A * | 6/1993 | Beekman .............. A43B 5/00 |
| | | 36/30 R |
| 5,231,776 A | 8/1993 | Wagner |
| 5,255,451 A | 10/1993 | Tong et al. |
| 5,261,169 A | 11/1993 | Williford |
| 5,337,492 A | 8/1994 | Anderie et al. |
| 5,348,693 A | 9/1994 | Taylor et al. |
| 5,353,526 A | 10/1994 | Foley |
| 5,367,791 A | 11/1994 | Gross et al. |
| 5,408,761 A | 4/1995 | Gazzano |
| 5,461,800 A | 10/1995 | Luthi et al. |
| 5,465,509 A | 11/1995 | Fuerst et al. |
| 5,511,323 A | 4/1996 | Dahlgren |
| 5,619,809 A | 4/1997 | Sessa |
| 5,661,864 A | 9/1997 | Valiant et al. |
| 5,678,329 A | 10/1997 | Griffin et al. |
| 5,682,685 A | 11/1997 | Terlizzi |
| 5,686,781 A | 11/1997 | Bury |
| 5,771,610 A | 6/1998 | McDonald |
| 5,876,767 A | 3/1999 | Mattes et al. |
| 5,896,680 A | 4/1999 | Kim et al. |
| 5,908,569 A | 6/1999 | Wilkening et al. |
| 5,983,524 A | 11/1999 | Polegato |
| 6,006,412 A | 12/1999 | Bergann et al. |
| 6,029,376 A | 2/2000 | Cass |
| 6,108,943 A | 8/2000 | Hudson et al. |
| 6,110,411 A | 8/2000 | Clausen et al. |
| 6,193,923 B1 | 2/2001 | Leyden et al. |
| 6,205,682 B1 | 3/2001 | Park |
| 6,259,962 B1 | 7/2001 | Gothait |
| 6,360,454 B1 | 3/2002 | Dachgruber et al. |
| 6,367,172 B2 | 4/2002 | Hernandez |
| 6,412,196 B1 | 7/2002 | Gross |
| 6,533,885 B2 | 3/2003 | Davis et al. |
| 6,540,864 B1 | 4/2003 | Chi |
| 6,601,042 B1 | 7/2003 | Lyden |
| 6,601,321 B1 | 8/2003 | Kendall |
| 6,660,209 B2 | 12/2003 | Leyden et al. |
| 6,694,207 B2 | 2/2004 | Darrah et al. |
| 6,763,611 B1 * | 7/2004 | Fusco .............. A43B 13/125 |
| | | 36/25 R |
| 6,769,202 B1 | 8/2004 | Luthi et al. |
| 6,817,112 B2 | 11/2004 | Berger et al. |
| 6,819,966 B1 | 11/2004 | Haeberli |
| 7,065,820 B2 | 6/2006 | Meschter |
| 7,077,638 B2 | 7/2006 | Leyden et al. |
| RE39,354 E | 10/2006 | Dickens, Jr. et al. |
| 7,148,286 B2 | 12/2006 | Baumann et al. |
| 7,207,125 B2 | 4/2007 | Jeppesen et al. |
| 7,291,002 B2 | 11/2007 | Russell et al. |
| 7,350,320 B2 * | 4/2008 | Chandler ............ A43B 13/14 |
| | | 36/28 |
| 7,424,783 B2 | 9/2008 | Meschter et al. |
| 7,484,318 B2 | 2/2009 | Finkelstein |
| 7,571,556 B2 | 8/2009 | Hardy et al. |
| 7,788,827 B2 | 9/2010 | Fogg et al. |
| 7,805,859 B2 | 10/2010 | Finkelstein |
| 8,522,454 B2 | 9/2013 | Schindler et al. |
| 9,320,316 B2 | 4/2016 | Guyan et al. |
| 9,572,402 B2 | 2/2017 | Jarvis |
| 9,788,600 B2 | 10/2017 | Wawrousek |
| 2001/0001904 A1 | 5/2001 | Hernadez |
| 2002/0023306 A1 | 2/2002 | Sajedi et al. |
| 2003/0051372 A1 | 3/2003 | Lyden |
| 2003/0069807 A1 | 4/2003 | Lyden |
| 2004/0104499 A1 | 6/2004 | Keller |
| 2004/0111920 A1 | 6/2004 | Cretinon |
| 2004/0118018 A1 | 6/2004 | Dua |
| 2004/0134099 A1 | 7/2004 | Jones et al. |
| 2004/0135292 A1 | 7/2004 | Coats et al. |
| 2004/0159014 A1 | 8/2004 | Sommer |
| 2004/0168329 A1 | 9/2004 | Ishimaru |
| 2004/0261295 A1 | 12/2004 | Meschter |
| 2005/0076536 A1 | 4/2005 | Hatfield et al. |
| 2005/0188564 A1 | 9/2005 | Delgorgue et al. |
| 2005/0282454 A1 | 12/2005 | Meschter et al. |
| 2006/0061012 A1 | 3/2006 | Hatfield et al. |
| 2006/0061613 A1 | 3/2006 | Fienup et al. |
| 2006/0064905 A1 | 3/2006 | Hudson et al. |
| 2006/0065499 A1 | 3/2006 | Smaldone et al. |
| 2006/0070260 A1 | 4/2006 | Cavanaugh et al. |
| 2006/0143839 A1 | 7/2006 | Fromme |
| 2006/0201028 A1 * | 9/2006 | Chan .............. A43B 7/142 |
| | | 36/28 |
| 2006/0254087 A1 | 11/2006 | Fechter |
| 2007/0022631 A1 | 2/2007 | Ho |
| 2007/0163147 A1 | 7/2007 | Cavanagh et al. |
| 2007/0227041 A1 | 10/2007 | Menghini |
| 2007/0232753 A1 | 10/2007 | Monsheimer et al. |
| 2007/0240333 A1 | 10/2007 | Le et al. |
| 2008/0060221 A1 | 3/2008 | Hottinger |
| 2008/0115389 A1 * | 5/2008 | Hsieh .............. A43B 13/181 |
| | | 36/30 A |
| 2008/0215176 A1 | 9/2008 | Borovinskih et al. |
| 2008/0289218 A1 | 11/2008 | Nakano |
| 2009/0012622 A1 | 1/2009 | James |
| 2009/0014424 A1 | 1/2009 | Meschter |
| 2009/0126225 A1 | 5/2009 | Jarvis |
| 2009/0145005 A1 | 6/2009 | Murphy et al. |
| 2009/0211119 A1 | 8/2009 | Moretti |
| 2009/0316965 A1 | 12/2009 | Milling et al. |
| 2010/0050480 A1 | 3/2010 | Polegato Morelli |
| 2010/0229430 A1 | 9/2010 | Berger et al. |
| 2011/0265352 A1 | 11/2011 | Lin |
| 2011/0277349 A1 | 11/2011 | Kim |
| 2012/0011782 A1 | 1/2012 | Kolas |
| 2012/0055043 A1 * | 3/2012 | Schindler ............ A43B 1/0009 |
| | | 36/83 |
| 2012/0117825 A9 | 5/2012 | Jarvis |
| 2014/0002019 A1 | 1/2014 | Park |
| 2014/0002677 A1 | 1/2014 | Schinker |
| 2014/0002903 A1 | 1/2014 | Shim |
| 2014/0020191 A1 | 1/2014 | Jones et al. |
| 2014/0025978 A1 | 1/2014 | Tokunaga |
| 2014/0026773 A1 | 1/2014 | Miller |
| 2014/0029030 A1 | 1/2014 | Miller |
| 2014/0029900 A1 | 1/2014 | Logan |
| 2014/0030067 A1 | 1/2014 | Kim |
| 2014/0109440 A1 | 4/2014 | McDowell |
| 2014/0109441 A1 | 4/2014 | McDowell et al. |
| 2014/0115920 A1 | 5/2014 | McCue |
| 2014/0182170 A1 | 7/2014 | Wawrousek |
| 2014/0226773 A1 | 8/2014 | Toth et al. |
| 2014/0259787 A1 | 9/2014 | Guyan et al. |
| 2014/0299009 A1 | 10/2014 | Miller et al. |
| 2014/0300675 A1 | 10/2014 | Miller et al. |
| 2014/0300676 A1 | 10/2014 | Miller et al. |
| 2015/0033581 A1 | 2/2015 | Barnes et al. |
| 2015/0128448 A1 | 5/2015 | Lockyer |
| 2015/0193559 A1 | 7/2015 | Musuvathy |
| 2016/0051009 A1 * | 2/2016 | Kormann .............. A43B 13/14 |
| | | 36/103 |
| 2016/0095385 A1 | 4/2016 | Nordstrom |
| 2016/0242502 A1 * | 8/2016 | Spanks .............. A43B 13/20 |
| 2016/0374428 A1 | 12/2016 | Kormann et al. |
| 2017/0224053 A1 * | 8/2017 | Truelsen .............. A43B 13/223 |

(56) References Cited

U.S. PATENT DOCUMENTS

| | | | | |
|---|---|---|---|---|
| 2017/0231322 A1* | 8/2017 | Gheorghian | ......... | A43B 13/186 267/141 |
| 2017/0332733 A1* | 11/2017 | Cluckers | .............. | A43B 17/006 |

FOREIGN PATENT DOCUMENTS

| | | |
|---|---|---|
| CN | 2357543 | 1/2000 |
| CN | 1252344 | 5/2000 |
| CN | 2676682 | 2/2005 |
| DE | 202004018209 | 1/2005 |
| DE | 102005023473 | 11/2006 |
| EP | 0526892 A3 | 7/1993 |
| EP | 0526892 A2 | 10/1993 |
| EP | 2564719 A1 | 3/2013 |
| EP | 2424398 B1 | 12/2015 |
| ES | 2442448 A1 | 2/2014 |
| JP | 08197652 | 8/1996 |
| JP | 0957874 | 3/1997 |
| JP | 39277384 A | 10/1997 |
| JP | 10240964 | 9/1998 |
| JP | 2002001827 A | 1/2002 |
| JP | 2004042545 A | 2/2004 |
| JP | 2009045244 A | 3/2009 |
| WO | 0053398 | 9/2000 |
| WO | 2001024575 | 4/2001 |
| WO | 2004018966 | 3/2004 |
| WO | 2004073416 | 9/2004 |
| WO | 2004092346 | 10/2004 |
| WO | 2006034261 | 3/2006 |
| WO | 2006047259 | 5/2006 |
| WO | WO2006098715 A1 | 9/2006 |
| WO | 2008010855 | 1/2008 |
| WO | 2009035831 | 3/2009 |
| WO | 2009114715 | 3/2009 |
| WO | WO2009086520 A1 | 7/2009 |
| WO | WO2009055451 A8 | 6/2010 |
| WO | N02010126708 A3 | 3/2011 |
| WO | WO2014009587 A1 | 1/2014 |
| WO | WO2014008331 A3 | 2/2014 |
| WO | WO2014015037 A3 | 4/2014 |
| WO | WO2014100462 A8 | 10/2014 |

\* cited by examiner

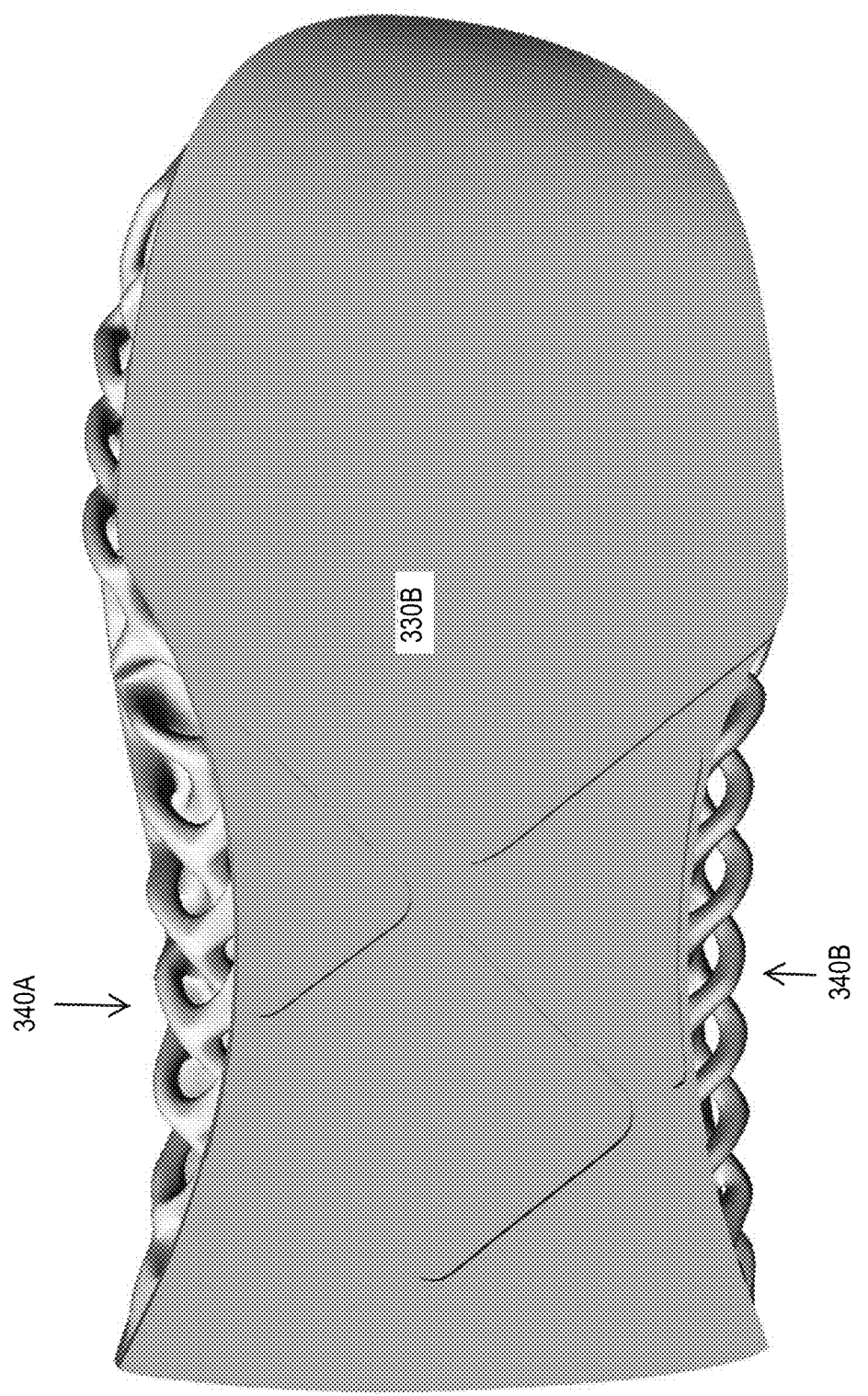

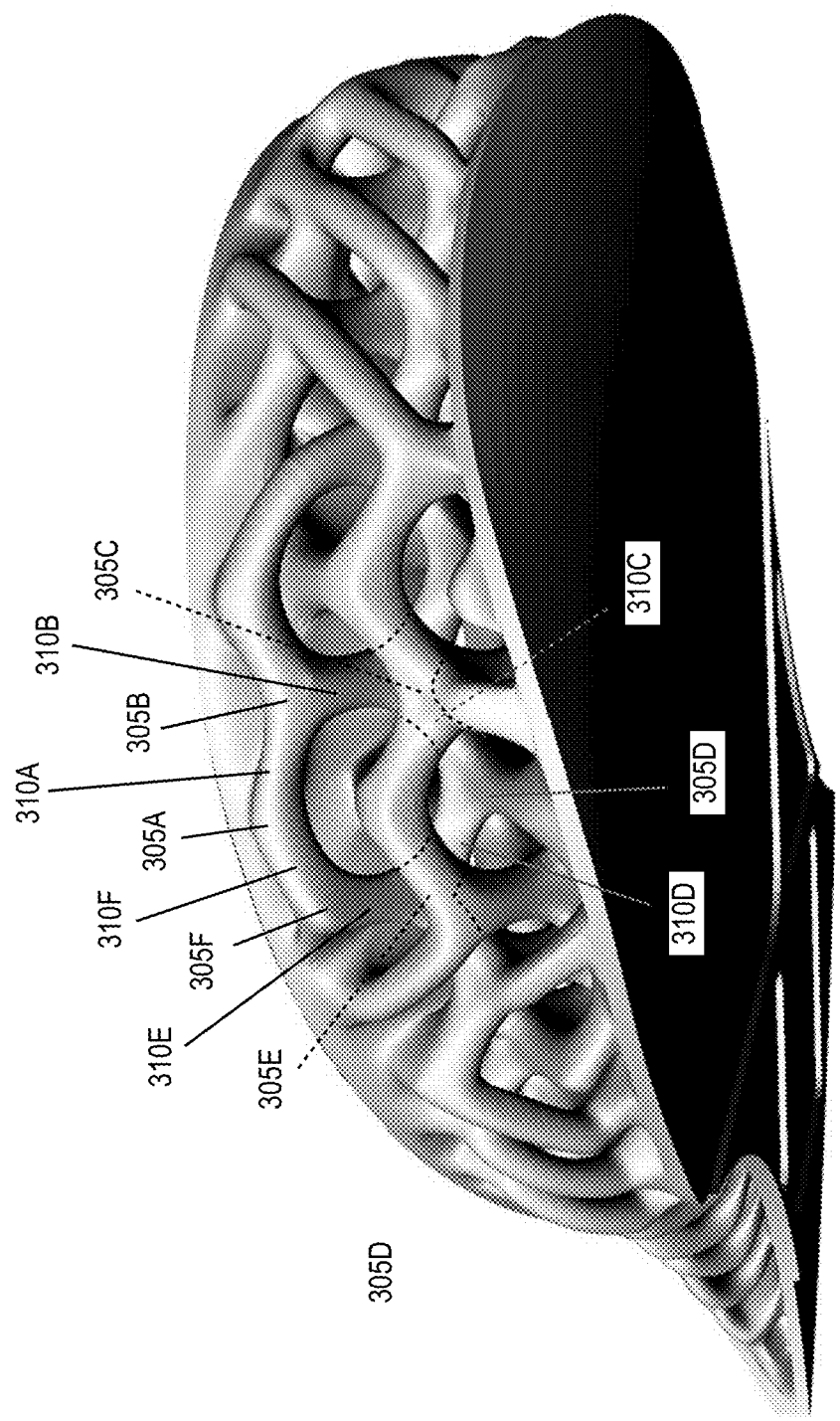

FOOTWEAR INCLUDING SOLE ASSEMBLY

CROSS-REFERENCE TO RELATED APPLICATIONS

This application claims priority to Provisional Application No. 62/158,950, filed 8 May 2015 and entitled "Footwear with Lattice Midsole and Compression Insert." This application further claims priority to Provisional Application No. 62/294,043, filed 11 Feb. 2016 and entitled "Footwear with Open Cell Support Structure." The disclosure of each of the aforementioned applications is incorporated herein by reference in its entirety.

FIELD OF THE INVENTION

This present invention is directed toward footwear including soles with cellular and/or lattice structures.

BACKGROUND OF THE INVENTION

Athletic shoes are often designed to meet the specific needs of particular sports and athletic activities. For example, running requires forward motion and stride efficiency. Power lifting, in contrast, requires low-compression stability. It would be desirable to provide an article of footwear capable of use in multiple athletic tasks (e.g., running and lifting).

SUMMARY OF THE INVENTION

An article of footwear includes an upper and a sole assembly. The sole assembly includes a unitary, open-celled structure. Specifically, the sole assembly includes a lattice structure having an interconnected network of struts and nodes that cooperate to define voids. The struts and nodes are configured to generate predetermined support and flexure properties within the network. The lattice may be configured as a conformal lattice, being contoured to receive accessories or complementary support structures. The sole assembly may further include an insert formed of compression material (e.g., foam). In operation, the lattice and foam insert cooperate to provide stability and cushioning to the article of footwear.

The above described features and advantages, as well as others, will become more readily apparent to those of ordinary skill in the art by reference to the following detailed description and accompanying drawings.

BRIEF DESCRIPTION OF THE DRAWINGS

FIG. 3G is a bottom view of a lattice structure of FIG. 3A.

FIG. 3H is a bottom, rear perspective view of the lattice structure of FIG. 3A.

Like reference numerals have been used to identify like elements throughout this disclosure.

DETAILED DESCRIPTION

Figure 1A:
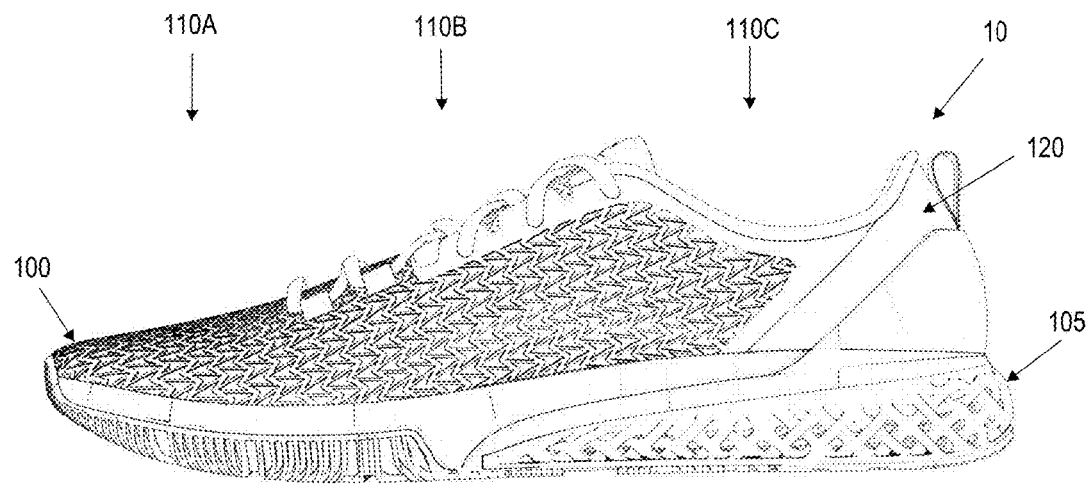
FIG. 1A is a side view of an article of footwear in accordance with an embodiment of the present invention.

Referring to FIGS. 1A-1F, the article of footwear 10 is an athletic shoe (e.g., a cross-training shoe) including an upper 100 coupled to a sole assembly 105 (e.g., connected via an adhesive, stitching, etc.). The article of footwear 10 defines a forefoot region 110A, a midfoot region 110B, and a hindfoot region 110C, as well as a medial side 115A and a lateral side 115B. The forefoot region 110A generally aligns with (is positioned proximate to) the ball and toes of the foot, the midfoot region 110B generally aligns with the arch and instep areas of the foot, and the hindfoot region 110C generally aligns with the heel and ankle areas of the foot. Additionally, the medial side 115A is oriented along the medial (big toe) side of the foot, while the lateral side 115B is oriented along the lateral (little toe) side of the foot.

The upper 100 includes a plurality of sections that cooperate to define a foot cavity. Specifically, a heel section 120 includes heel cup configured to align with and cover the calcaneus area of a human foot. A lateral quarter section 125, disposed forward the heel section 120, is oriented on the lateral shoe side 115B. Similarly, a medial quarter section 130, disposed forward the heel section 120, is oriented on the medial shoe side 115A. A vamp section 135 is disposed forward the quarter sections 125, 130 (e.g., forward the tongue slot) and a toe cage section 140 is disposed forward the vamp section. The upper 100 may further include tongue 145 disposed within tongue slot 150 configured to align with and span the instep area of the foot.

With this configuration, the heel 120, lateral quarter 125, medial quarter 130, vamp 135, toe cage 140, and tongue 145 cooperate with the sole assembly 105 to define a foot cavity into which a human foot is inserted by way of an access opening 155 bounded by a collar 157. The foot may be secured within the cavity utilizing a fastening device 160 such as a lacing system, a cable system, a hook and loop fastener, etc.

Referring to FIGS. 2A-2E, the sole assembly 105 includes midsole 200 and an outsole 205. The midsole 200 includes one or more structures operable to support the user and to adapt to load conditions during use. In an embodiment, the midsole 200 includes a non-stochastic support structure 210. In a further embodiment, the midsole is a hybrid system including a non-stochastic support structure and a stochastic support structure 215. A non-stochastic structure includes a plurality of cells arranged in an ordered, repeating manner. The cells of stochastic structures, in contrast, are not ordered, including cells with random variations in location, shape and size. Stated another way, the non-stochastic support structure 210, is a periodic cellular solid with ordered cells, while the stochastic support structure 215 is a material including cells arranged randomly (in size, shape, and/or location). By way of example, the non-stochastic support structure 210 is a lattice structure (e.g., a microlattice), while stochastic support structure 215 is foam.

Referring to FIGS. 3A-3I, the lattice (non-stochastic) structure 210 possesses a unitary (monolithic or unibody) construction with a lattice topology defined by a plurality of interconnected cells 300. Each cell 300 includes a node 305 from which a beam or strut 310 extends, generally from one node to another node (or from node to plate or plate to plate, described in more detail, below). The nodes 305 are disposed at selected locations throughout the lattice 305. By way of example, the nodes 305 are arranged in an array, with the nodes generally organized into columns and/or rows. The nodes 305 of adjacent rows/columns may be aligned or may be offset relative to each other. In general, nodes 305 are locations at which multiple beams intersect.

The struts 310 are structural members configured to flex or compress in a predetermined direction under load or to resist flexure when a predetermined directional load is applied. The strut 310 may possess any profile suitable for its described purpose. Each strut 310 is generally non-linear. By way of example, a strut 310 may be generally arcuate, curving inboard, outboard, rearward, and/or forward as the strut travels distally from the node. By way of further example, a strut 310 may define a simple curve, a compound curve, and/or combinations thereof. In an embodiment, the strut curves outward (toward the perimeter of the structure 210) and/or inward (toward the center of the structure 210) as it extends from node to node. The dimensions (length and diameter) may be any suitable for its described purpose. In and embodiment, the lattice structure 210 includes a plurality of full-length struts and a plurality of truncated length struts.

Figure 3A:
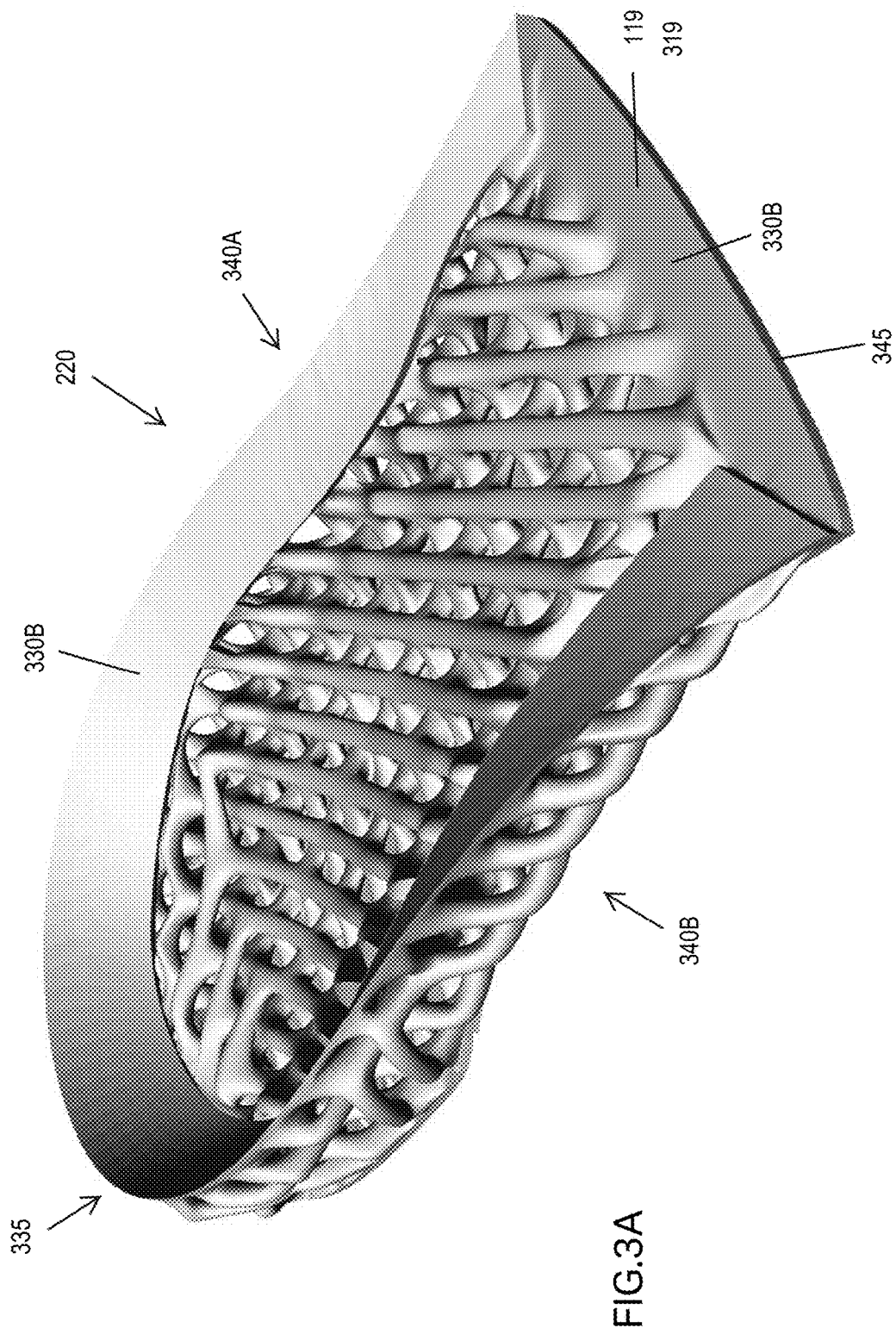
FIG. 3A is a front perspective view of the lattice structure of the article of footwear of FIG. 1, the structure shown in isolation.
Figure 3B:
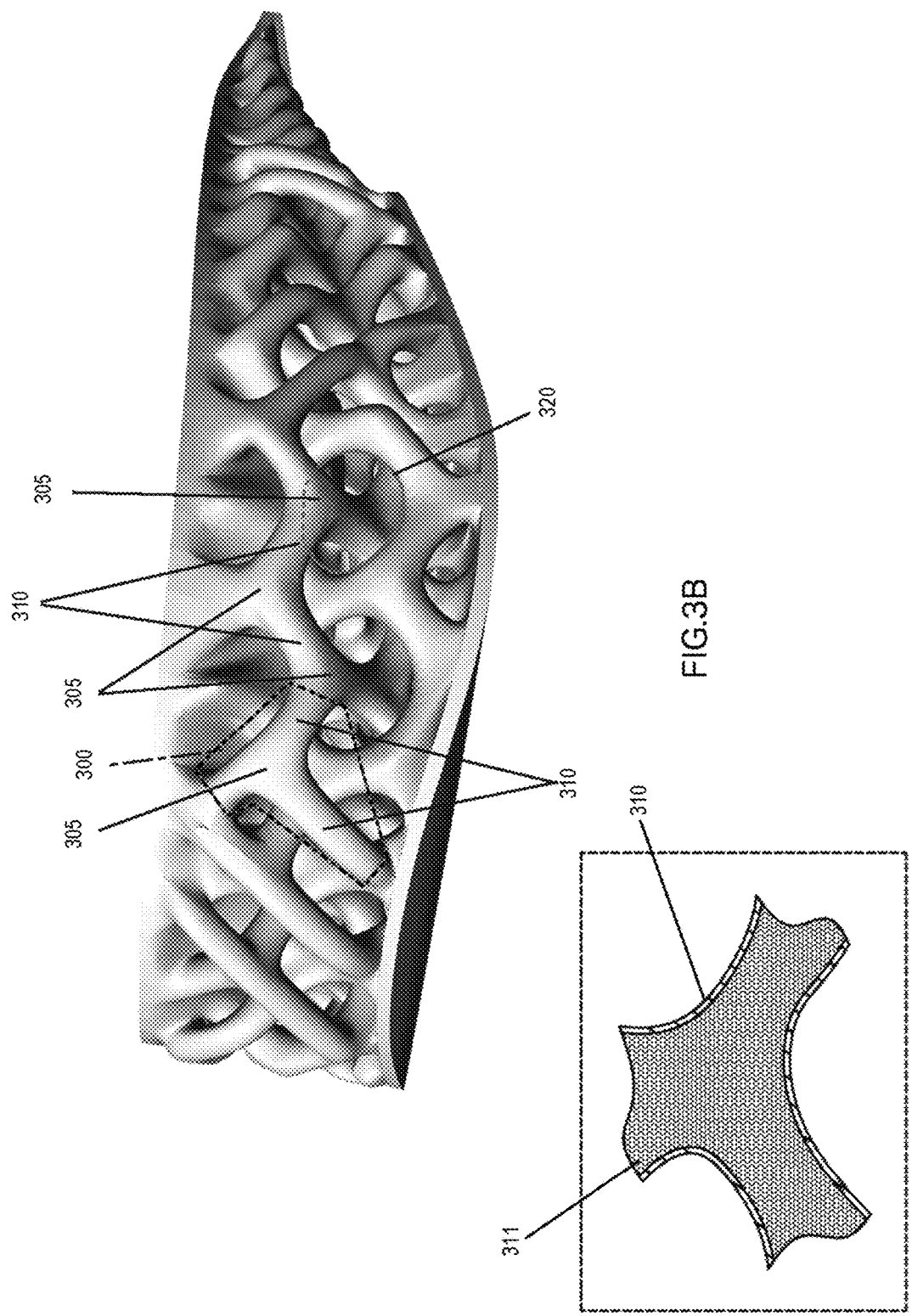
FIG. 3B is a rear perspective view of the lattice structure of FIG. 3A.
Figure 3C:
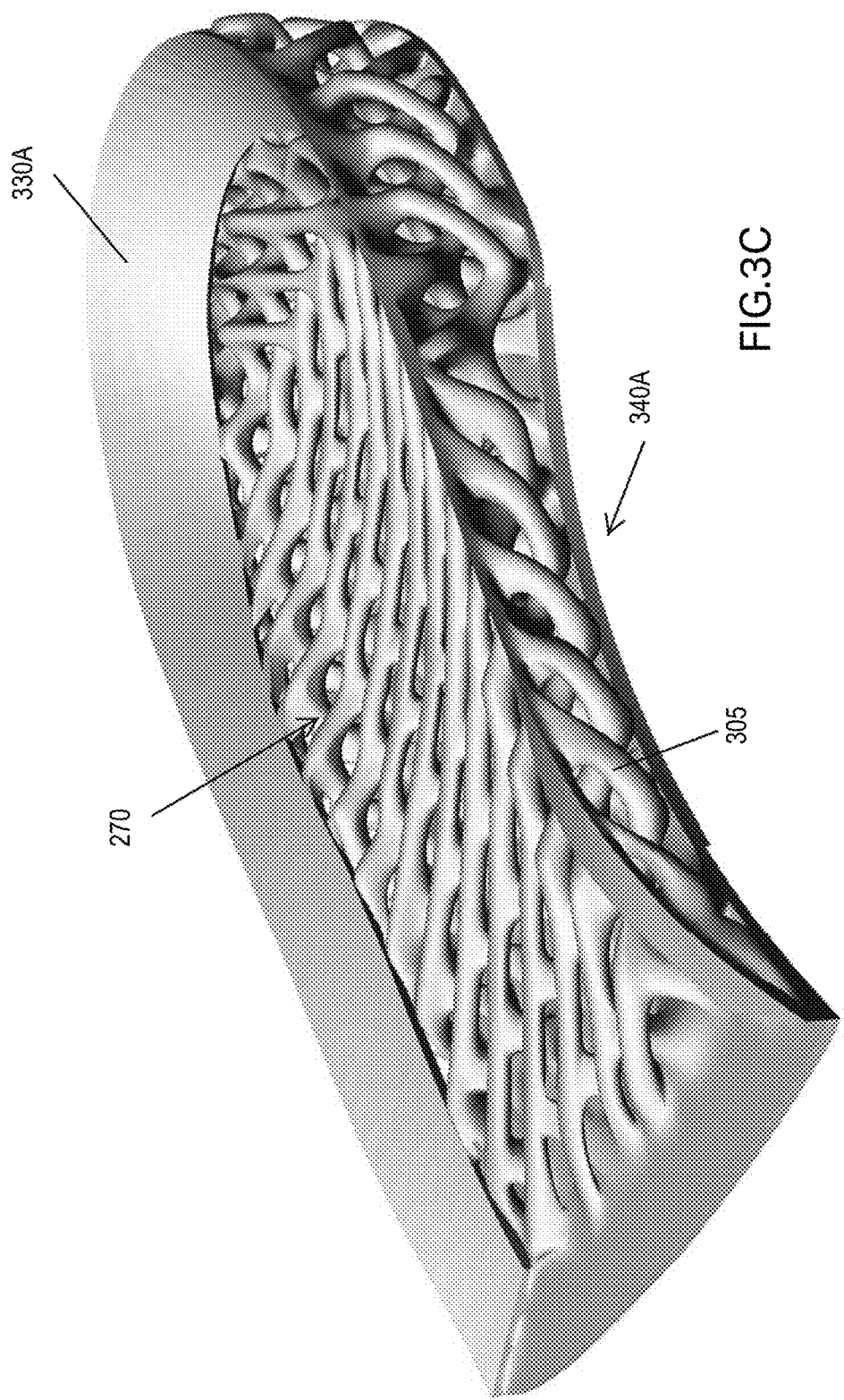
FIG. 3C is a front perspective view of a lattice structure of FIG. 3A.
Figure 3D:
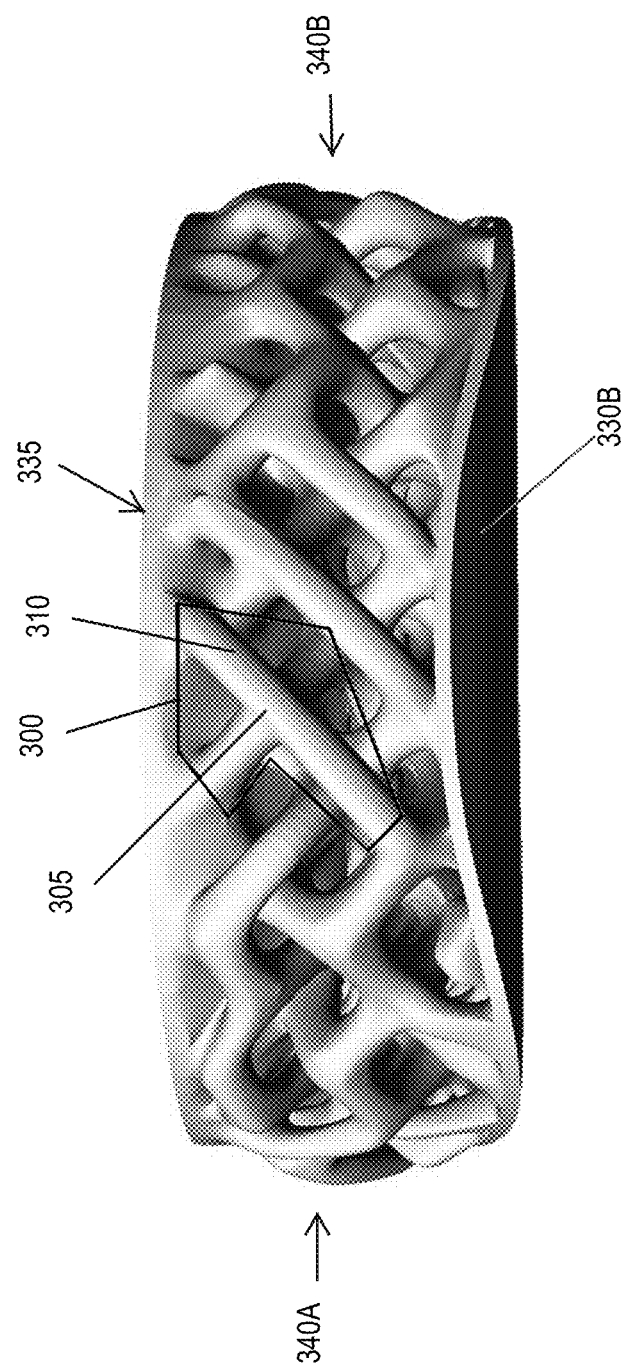
FIG. 3D is a rear view in elevation of the lattice structure of FIG. 3A.
Figure 3E:
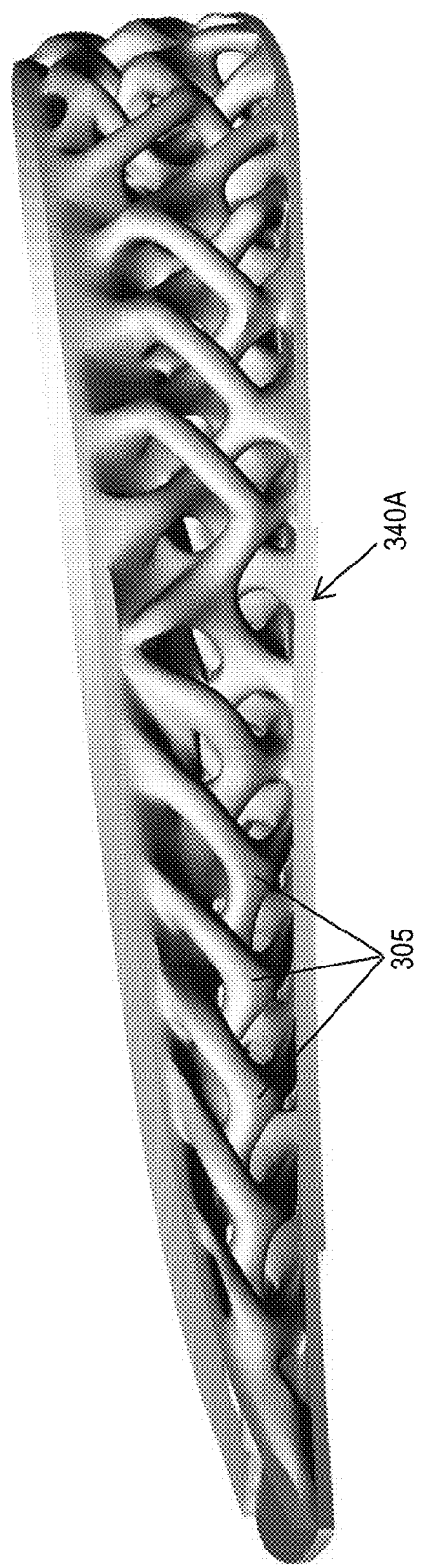
FIG. 3E is a side view of the lattice structure of FIG. 3A, showing the medial side.
Figure 3F:
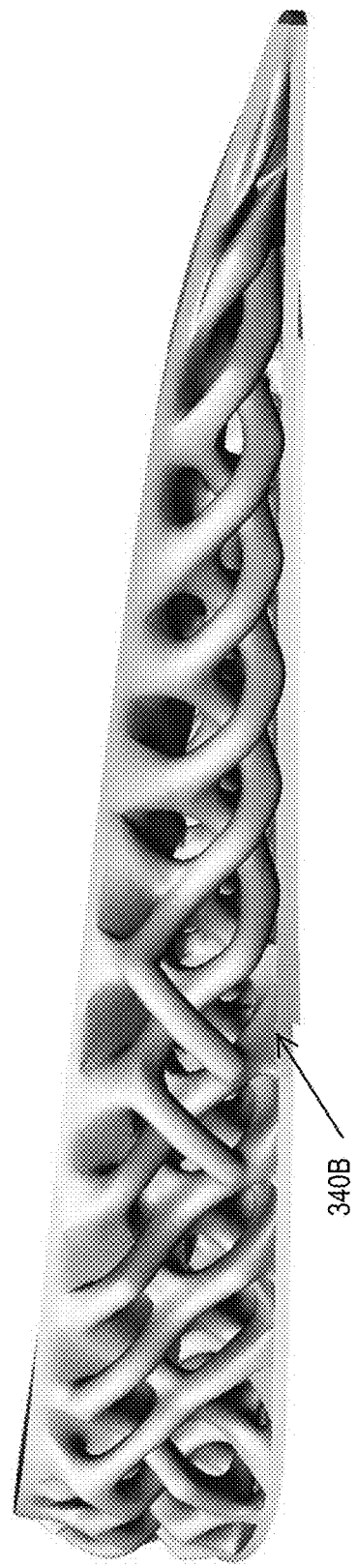
FIG. 3F is a side view of the lattice structure of FIG. 3A, showing the lateral side.

The cross section of each strut 310 may be any cross section suitable for its described purpose (to resiliently support a load). As is shown in the inset of FIG. 3B, in the illustrated embodiment, each strut 310 possesses a generally circular cross section. It should be understood, however, that other cross sections (e.g., polygonal, elliptical, etc.) may be utilized. Each strut 310, moreover, may be solid or hollow structure. In the embodiment shown in the inset of FIG. 3B, the strut includes an internal cavity or channel housing (e.g., filled with) with particles. As explained in greater detail below, the strut 310 may be formed via an additive manufacturing process in which a batch of particulate material is sintered such that adjacent particles are fused (via, e.g., laser), becoming molten then solidifying into a unitary structure. In operation, a computer aided design forms the template for the fusion pattern of the particulate material. The template specifies the locations at which the particulate material is fused. Thus, the template may specify fusion of the entire strut 310 across its length and diameter, forming a solid strut. Alternatively, the template can specify fusion of only the outline (outer wall) of the strut along its length, thereby forming a hollow or channeled strut with unfused particulate captured therein (e.g., microparticles having an particle size of approximately 20 µm to approximately 100 µm (e.g., 15-110 µm)). The same processes may be utilized to form the nodes 305. Accordingly, the lattice structure 210 may be entirely formed of hollow structural members (nodes, struts, and panels, which may be at least partially filled with microparticles 311, as is shown in the inset of FIG. 3B), be entirely formed of solid structural members, or be formed of both hollow and solid structural members. In an embodiment, all the structural members are solid.

Additional information on non-solid structural elements is described in U.S. patent application Ser. No. 15/148,578, filed 6 May 2016 and entitled Midsole Lattice Structure with Hollow Tubes for Footwear," the disclosure of which is incorporated herein by reference in its entirely.

As noted above, a node 305 and one or more struts 310 form a cell 300. In an embodiment, a plurality of struts 310 are oriented in spaced relation about node 305. Accordingly, adjacent struts 310 on a node 305 are angularly spaced from each other about the node perimeter. A node 305 may include any number of struts suitable for its described purpose. By way of example, a cell 300 may include two, three, or four struts 310. The struts 310, furthermore, may extend from the node at any predetermined node location.

A plurality of adjacent and/or interconnected cells 300 cooperates to define a pore or void 320 within the lattice structure 210. The voids 320 may be full voids (possessing a generally circular shape) or truncated voids (possessing a generally semicircular shape). The diameter of full voids 320 may be generally consistent throughout the lattice structure 210. Referring to FIG. 3H, a void 320 is defined by a plurality of nodes 305A-305F interconnected by a plurality of non-linear (e.g., generally arcuate) struts 310A-310F. As shown, the void 320 is generally circular. Stated another way, an annular supercell may include a plurality of angularly spaced nodes 305A-305F interconnected by a plurality of non-linear struts 310A-310F (with adjacent nodes being connected via an arcuate strut).

Figure 3I:
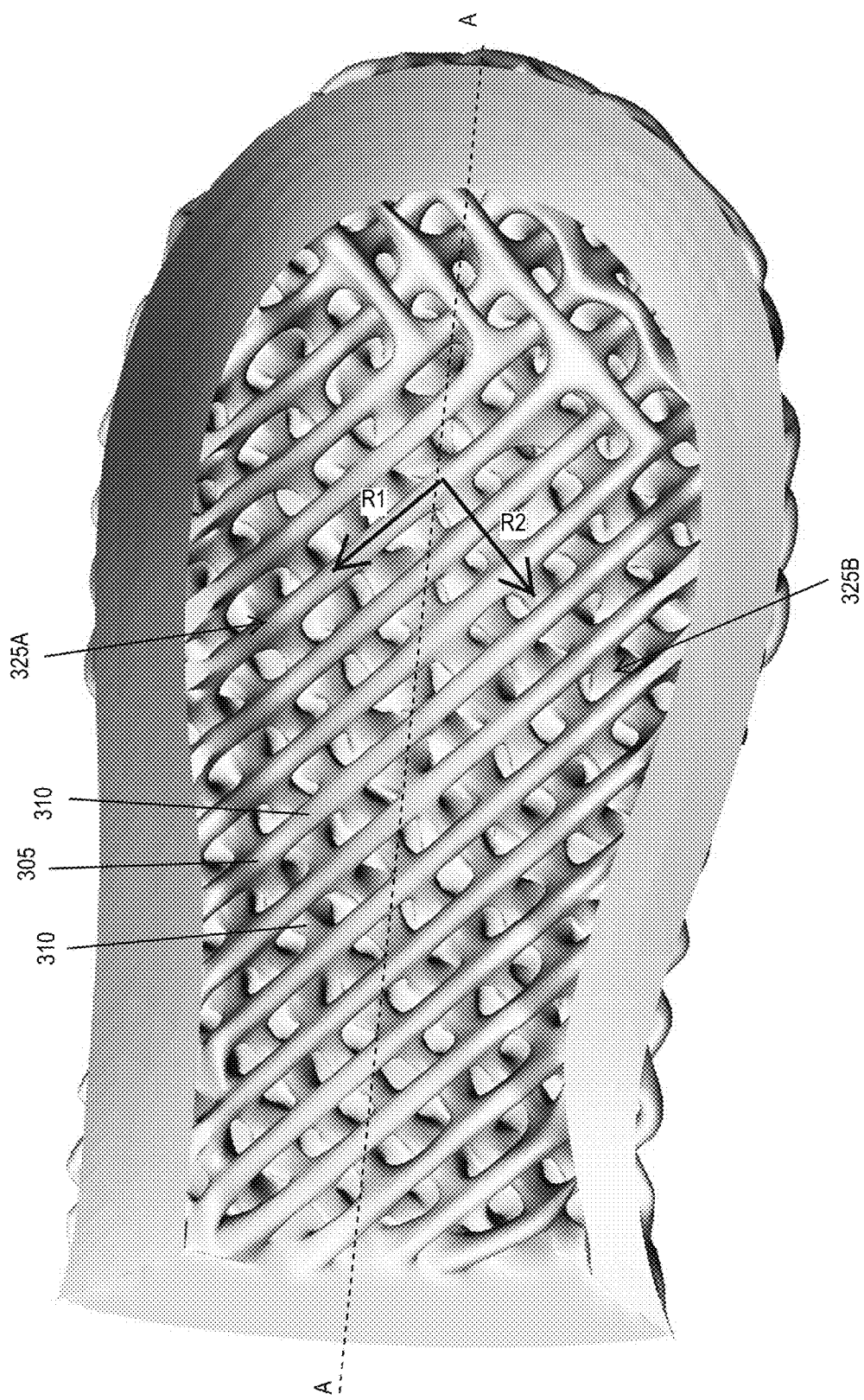
FIG. 3I is a top view of the lattice structure of FIG. 3A.

Referring to FIG. 3I, the lattice structure 210 includes a first plurality of rows 325A and a second plurality of rows 325B spanning the structure. The first plurality of rows 325A is oriented at an angle relative to the second plurality of rows 325B (indicated by arrows R1 and R2). Specifically, the first plurality of rows 325A is generally orthogonal to the second plurality of rows 325B. Each row 325A, 325B, moreover, is oriented at an angle relative to the longitudinal axis A of the lattice structure 210. By way of example, each row 325A, 325B is oriented approximately 45° with respect to the structure axis A. This configuration positions the nodes 305, struts 310, and/or voids 320 at predetermined (regular) locations to define a regular repeating pattern of cells.

In addition, the lattice structure 210 may be organized such that cells 300 selectively intersect the voids 320, with the nodes 305 and/or strut 310 of one cell passing through a void 320 of another cell.

The dimensions of the nodes 305, struts 310, and/or voids 320 may be any suitable for the described purpose of the relevant component. By way of example, the nodes 305 may possess a diameter of approximately 5 mm to approximately 10 mm (e.g., 7 mm); the struts 310 possess a diameter of approximately 2 mm to approximately 5 mm (e.g., 3 mm); and the voids 320 possess a diameter of approximately 10 mm to approximately 15 mm (e.g., 12 mm).

The lattice structure 210 may further include a first plate or panel 330A disposed on the upper side of the lattice structure 210 and a second plate or panel 330B is disposed along the lower side of the lattice structure. Each plate 330A, 330B, formed integrally with the lattice structure, is generally planar. With this configuration, the lattice structure 210 cooperates with the plates 330A, 330B to form a truss. The top plate may only span the outer perimeter of the lattice structure 210. In contrast, the bottom plate spans the entire lattice structure 210.

Figure 4A:
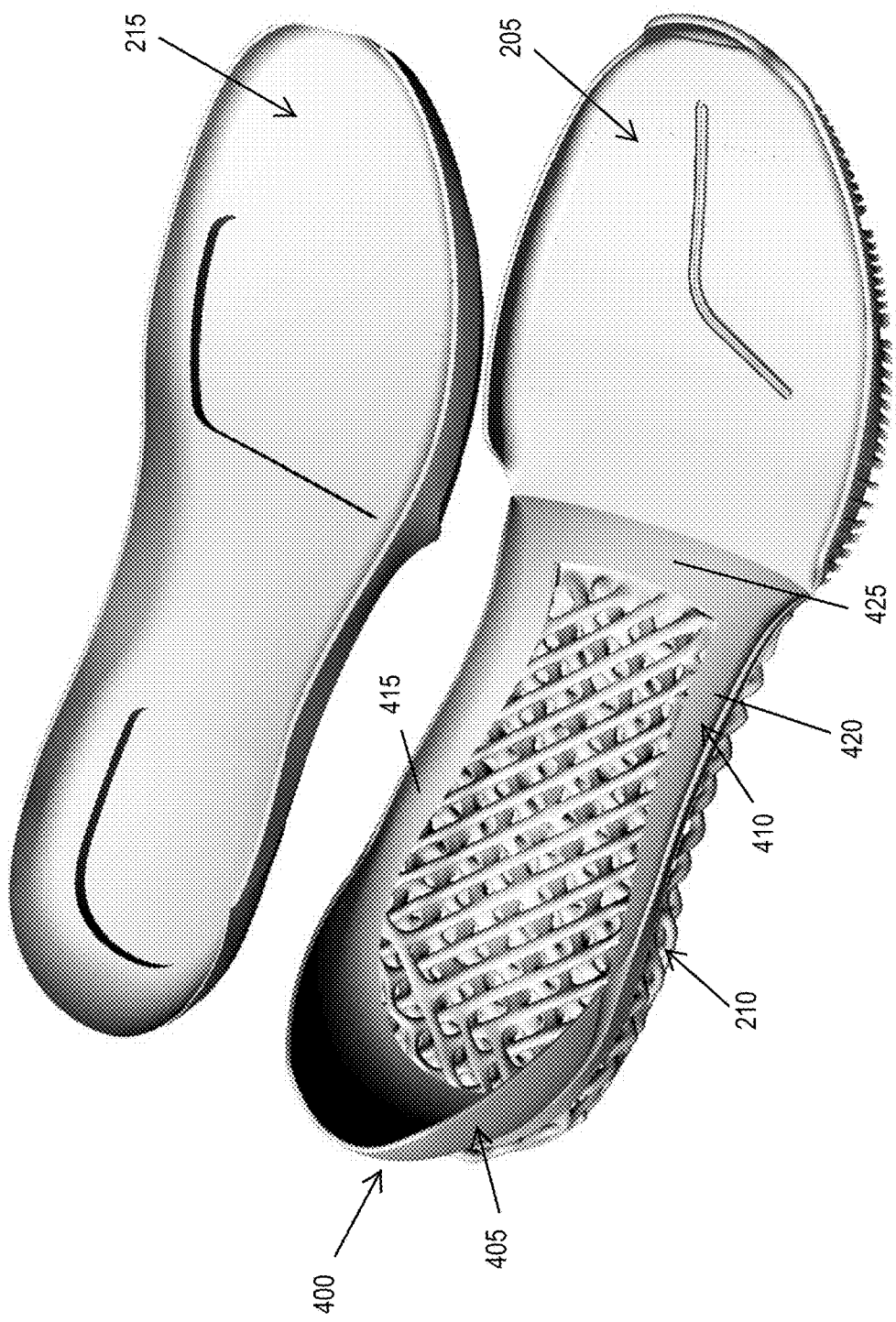
FIG. 4A is an exploded view of the sole assembly shown in FIG. 2A.
Figure 4B:
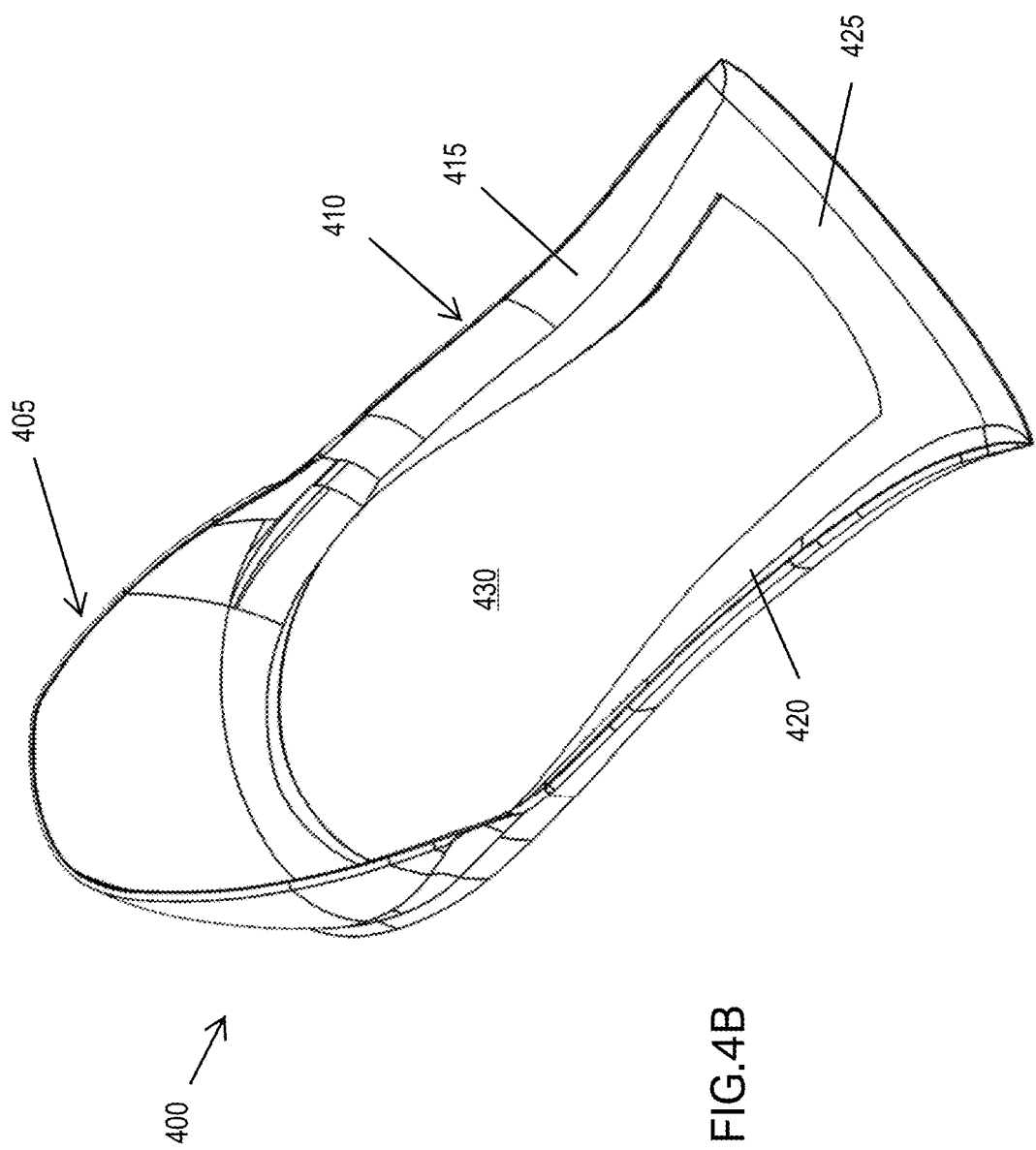
FIG. 4B is a perspective view of a heel component of the sole assembly shown in FIG. 4A.

The upper plate 330A, spanning the outer wall of the lattice structure 210, forms a flange operable to engage a corresponding flange on the heel counter and/or the stochastic structure 215 (discussed in greater detail, below). Referring to FIGS. 4A and 4B, the sole assembly 105 further includes a heel support 400 disposed between the non-stochastic structure and the stochastic structure that includes a heel counter 405 and a frame 410 with a medial arm or flange 415, a lateral arm or flange 420, and a forward flange or header 425 extending from the medial arm to the lateral arm. The heel counter and arms 410, 415, 420, 425 cooperate to define a window 430. The medial arm 415 and the lateral arm 420 are contoured to engage the medial and lateral sides of the upper plate 330A. The forward flange 425 similarly engages the top surface of the bottom plate 330B at forward edge 345.

The material forming the lattice structure 210 should be resilient to permit the absorption of forces and/or the production of return energy. That is, the material should possess proper compression strength and modulus (in x and z directions). In an embodiment, an elastomer such as thermoplastic polyurethane is utilized. Preferred materials are those suitable for additive manufacturing processes. Additive manufacturing fabricates objects directly from 3D model data by adding material layer upon layer. Examples include stereolithography, selective laser sintering, fused deposition modeling. By way of example, thermoplastic polyurethanes possessing hardness (ISO 868, 23° C./50% relative humidity) of approximately 85-95 Shore A may be utilized to form the lattice structure 210 (e.g., LUVO-SINT®, Lehmann & Voss & Co., Germany).

The performance (mechanical) properties of the lattice structure 210 may be customized by controlling the cell location, strut dimensions (strut length and diameter (thickness)), strut angle (from the node), as well as the position and nature of the voids within the structure. That is, strut placement may encourage or discourage flexure, controlling the movement properties of the lattice structure 210 under load. Stated another way, by controlling the topology of the cellular solid, it is possible to control the micromechanical performance of the lattice structure 210 under load. Accordingly, portions of the lattice structure 210 may be configured to experience bending under load, while other portions may be configured to experience compression under load. Specifically, the struts may experience both bending and compression depending on the nature (direction) of the force applied. This is advantageous in footwear in which load conditions change during use (as the user changes activity from forward running, to stopping, to moving to the left and right).

The lattice structure 210 may traverse only a portion of the article of footwear. In the embodiment illustrated in FIGS. 3A-3I, the lattice structure 210 is a rearfoot support spanning approximately half of the shoe length, extending from the heel region 110C to the midfoot region 110B. Accordingly, the rearfoot support begins proximate the heel, extending forward and terminating proximate the arch of the foot. As shown, the rearfoot support tapers downward as it travels forward from its rear edge 335 such that height of each of the medial side 340A and the lateral side 340B flattens, terminating at forward edge 345.

Figure 5:
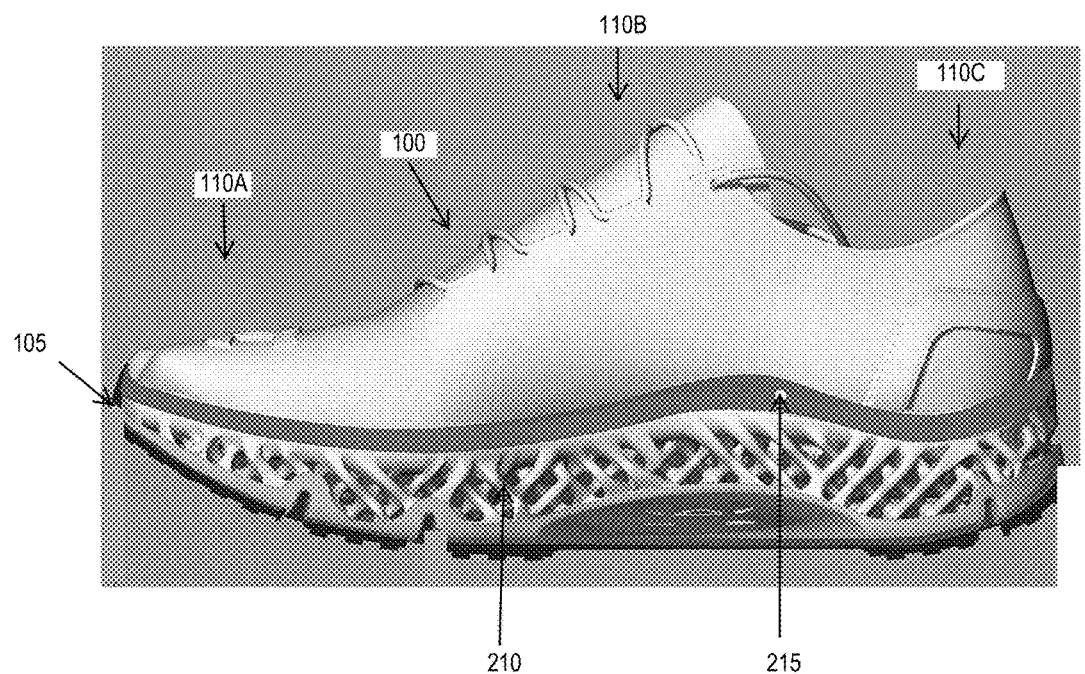
FIG. 5 is a side view in elevation of an article of footwear in accordance with an embodiment of the invention.

Alternatively, the lattice structure 210 may traverse the full dimensions (length and width) of the article of footwear 10. Referring to FIG. 5, the lattice structure 210 extends from the forefoot section 110A, through the midfoot section 110B, and to the rearfoot section 110C. Additional information on full-length lattice structures is described in U.S. patent application Ser. No. 15/148,549, filed 6 May 2016 and entitled "Footwear with Lattice Midsole and Compression Insert," the disclosure of which is incorporated herein by reference in its entirety.

The lattice structure 210, furthermore, may be a conformal lattice structure, possessing a contoured topology operable to mate with or receive another object. That is, the lattice structure 210 is contoured to another surface and/or contoured to receive another structure, conforming to the natural geometry surface and aligning with the load plane to exhibit predictable performance behavior. This, in turn, provides for the reinforcement of contoured shapes that is oriented perpendicular to the surface thereby optimizing vibration dampening, noise attenuation, and impact absorption. In addition the lattice structure 210 may be adapted to receive an element housed in the sole assembly such as an electronic sensor (e.g., a housing including a sensor adapted to track the user's movements).

In an embodiment, the lattice structure 210 is contoured to receive the foam structure 215. By way of example, it may possess a generally curving top surface to accommodate the curving surface of the foam structure 215. In this manner, the lattice structure 210 includes a cavity 270 operable to receive and support the stochastic structure 215.

Figure 1B:
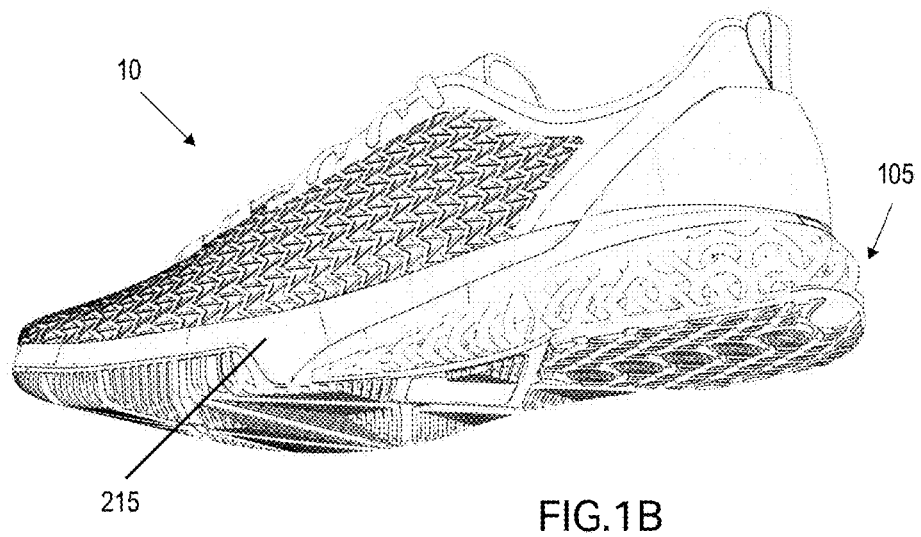
FIG. 1B is a rear perspective view of the article of footwear of FIG. 1.
Figure 1C:
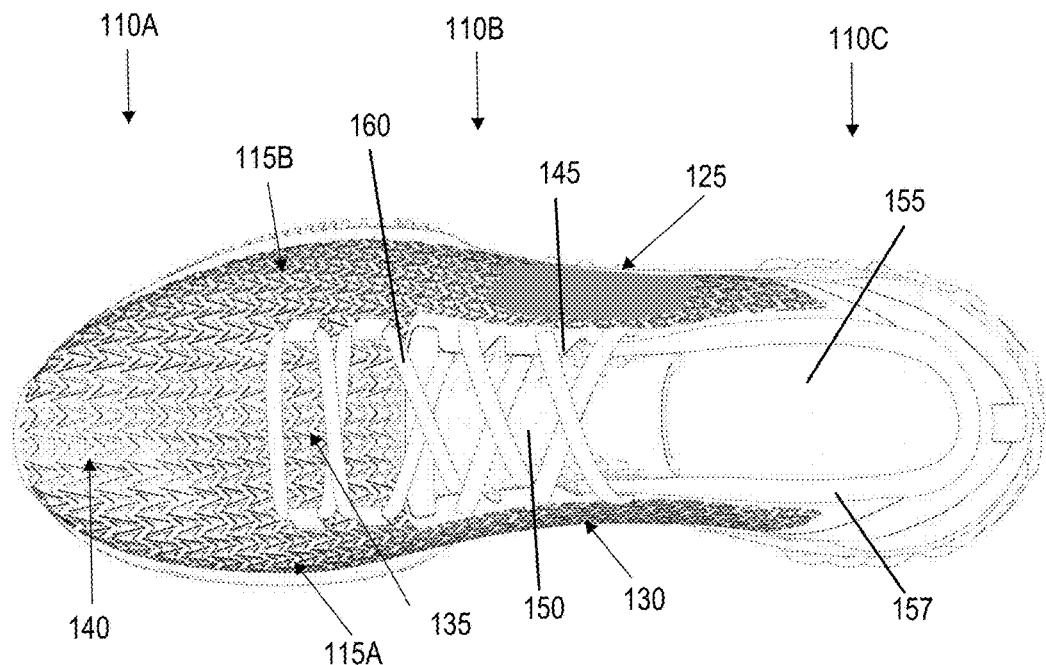
FIG. 1C is a top plan view of the article of footwear of FIG. 1.
Figure 1D:
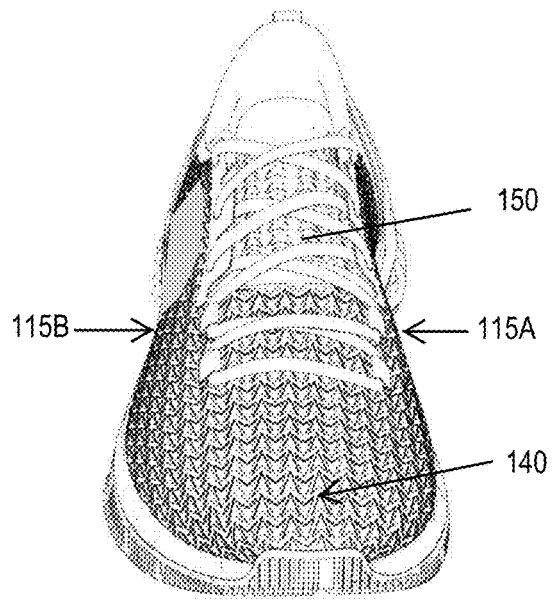
FIG. 1D is a front view in elevation of the article of footwear of FIG. 1.
Figure 1E:
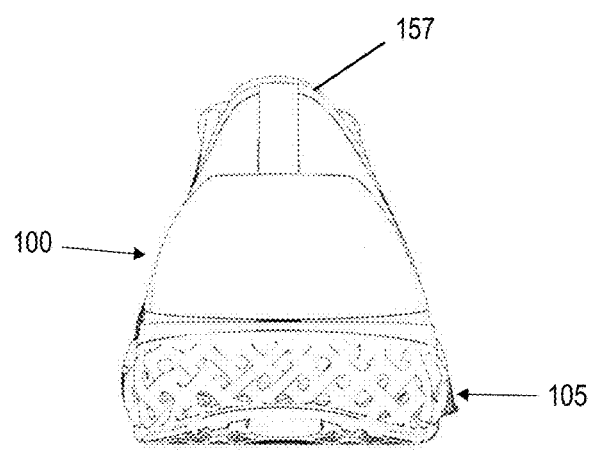
FIG. 1E is a rear view in elevation of the article of footwear of FIG. 1.
Figure 1F:
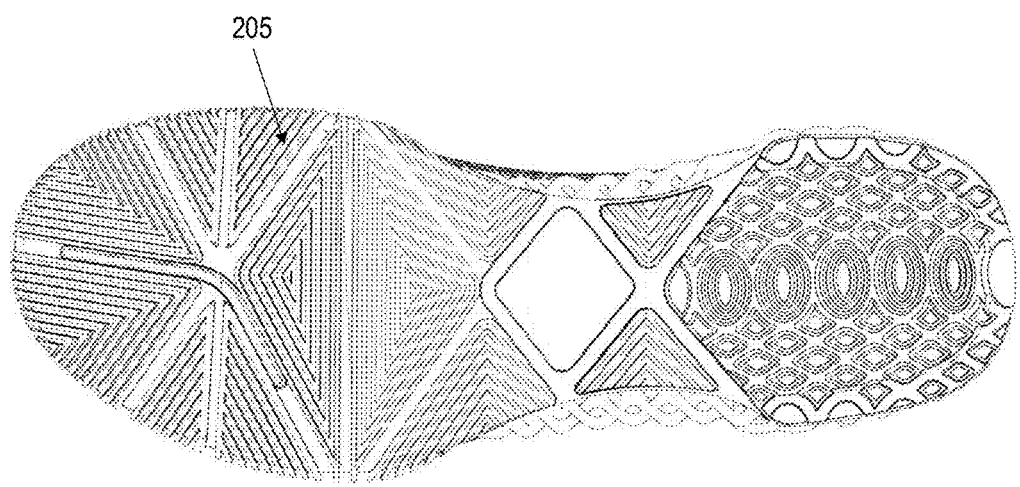
FIG. 1F is a bottom plan view of the article of footwear of FIG. 1.
Figure 2A:
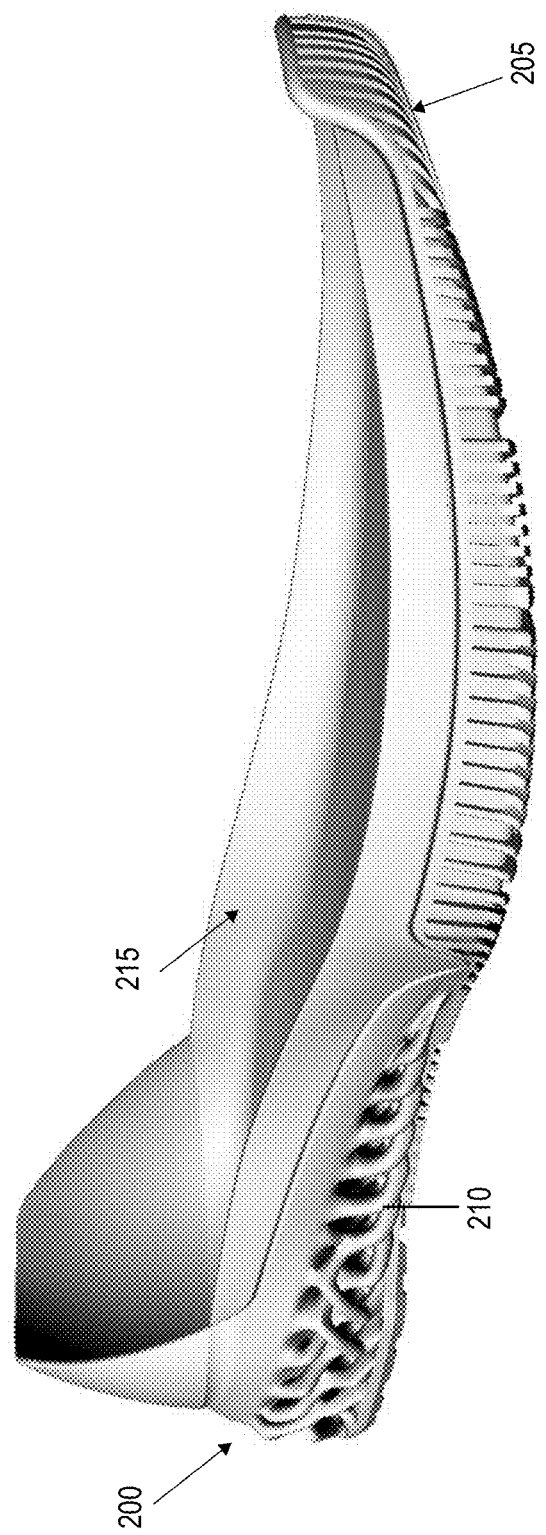
FIG. 2A is a perspective view of a sole assembly in accordance with an embodiment of the present invention, with the sole assembly shown in isolation.
Figure 2B:
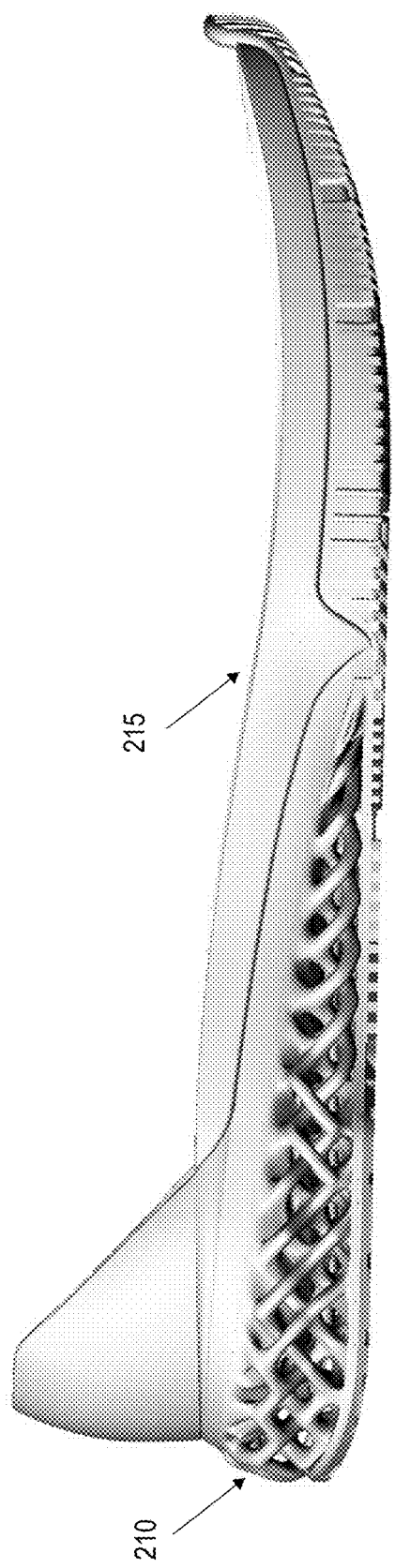
FIG. 2B is a side view in elevation of the sole assembly of FIG. 2A, showing sole assembly lateral side.
Figure 2C:
FIG. 2C is a side view in elevation of the sole assembly of FIG. 2A, showing sole assembly medial side.
Figure 2D:
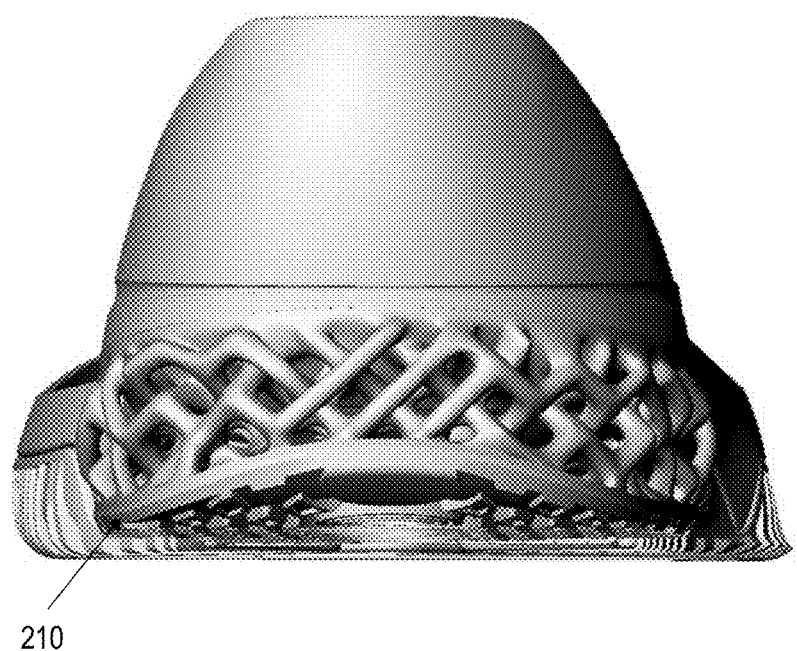
FIG. 2D is a rear view in elevation of the sole assembly of FIG. 2A.
Figure 2E:
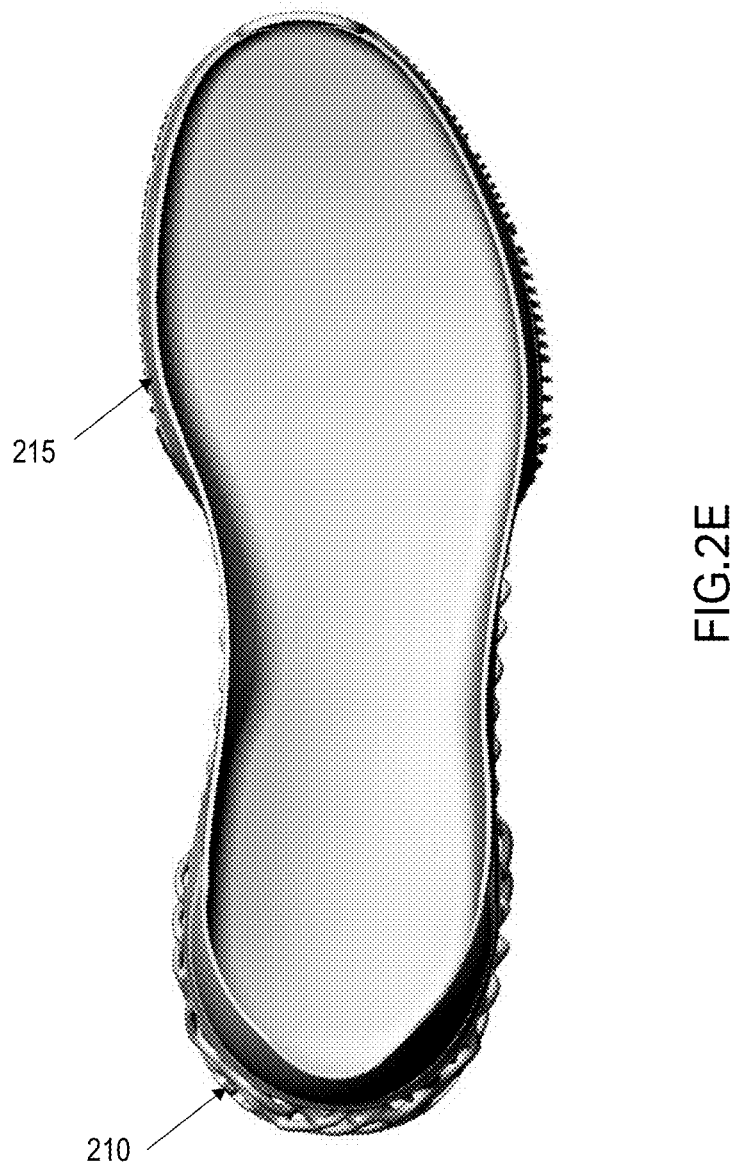
FIG. 2E is a top plan view of the sole assembly of FIG. 2A

The stochastic structure 215 is a stochastic cellular solid such as opened-cell foam or closed-cell foam. Referring to FIG. 1B, the foam support 215 is positioned between the upper and the lattice structure 110. The foam support 215 spans the length of the upper, extending from the hindfoot region 130C, through the midfoot region 130B, and to the forefoot region 130A. The foam support 215 may be formed of one metal foams and polymer foams. Metal foams include aluminum foams and nickel foams. Polymer foams include ethylene vinyl acetate (EVA), as well as an EVA blended with one or more of an EVA modifier, a polyolefin block copolymer, and a triblock copolymer, and a polyether block amide.

With the above described configuration, an article of footwear is provided that, while lightweight, exhibits stability or cushioning under differing load conditions caused by changes in user behavior (running, weight lifting, etc.). The foot varies in shape and structure between different users, generating different amounts of pressure in different regions during different stages of a gait cycle. The different zones of the sole assembly 105 accommodates for these variances by providing a dynamic truss structure (the non-stochastic structure 215) under heel, transitioning to a compression material (the stochastic structure 210) under the toes.

While the invention has been described in detail and with reference to specific embodiments thereof, it will be apparent to one skilled in the art that various changes and modifications can be made therein without departing from the spirit and scope thereof. For example, while most of the example embodiments depicted in the figures show an article of footwear (shoe) configured for a right foot, it is noted that the same or similar features can also be provided for an article of footwear (shoe) configured for a left foot (where such features of the left footed shoe are reflection or "mirror image" symmetrical in relation to the right footed shoe).

It is to be understood that terms such as "top", "bottom", "front", "rear", "side", "height", "length", "width", "upper", "lower", "interior", "exterior", "inner", "outer", and the like as may be used herein, merely describe points of reference and do not limit the present invention to any particular orientation or configuration.

Thus, it is intended that the present invention covers the modifications and variations of this invention provided they come within the scope of the appended claims and their equivalents.

What is claimed is:

1. An article of footwear defining a forefoot region, a hindfoot region, and a midfoot region disposed between the forefoot region and the hindfoot region, the article of footwear comprising:
    an upper;
    a sole assembly oriented below the upper, the sole assembly comprising a support structure including:
        a lattice structure including a plurality of nodes interconnected by a plurality of non-linear struts, the lattice structure defining a first side and a second side opposite the first side,
        a first plate formed integrally with the lattice structure and disposed on the first side of the of the lattice structure, the first plate forming a flange along a perimeter of the sole assembly on the first side, and
        a second plate formed integrally with the lattice structure and disposed on the second side of the lattice structure,
        wherein the plurality of nodes and the plurality of non-linear struts define a plurality of generally circular voids within the lattice structure;
    a compression element coupled to the first side of the lattice structure; and
    an outsole coupled to the second side of the lattice structure.

2. The article of footwear according to claim 1, wherein the plurality of nodes is arranged in array.

3. The article of footwear according to claim 1, wherein the compression element is coupled to the first plate.

4. The article of footwear according to claim 1, wherein the compression element is a foam member extending from the hindfoot region to the forefoot region of the article of footwear.

5. The article of footwear according to claim 1, wherein the lattice structure is located within the hindfoot region and the midfoot region of the article of footwear.

6. The article of footwear according to claim 5, wherein the lattice structure terminates within the midfoot region.

7. The article of footwear according to claim 6, wherein the outsole is coupled to the second side of the lattice structure and the compression element.

8. The article of footwear according to claim 1, wherein:
    nodes of the plurality of nodes are angularly spaced from each other; and
    one or more struts of the plurality of non-linear struts extend between adjacent nodes such that a strut from one cell intersects a void of another cell.

9. The article of footwear according to claim 1, wherein the lattice structure further includes a strut extending through a circular void of the generally circular voids.

10. The article of footwear according to claim 1, wherein the first side of the lattice structure is contoured to receive the compression element.

11. The article of footwear according to claim 1, wherein the lattice structure includes a first plurality of rows and a second plurality of rows spanning the structure.

12. The article of footwear according to claim 11, wherein the first plurality of rows is oriented at an angle relative to the second plurality of rows.

13. The article of footwear according to claim 12, wherein the first plurality of rows is generally orthogonal to the second plurality of rows.

14. The article of footwear according to claim 13, wherein each row of said first and second plurality of rows is oriented at an angle relative to a longitudinal axis of the lattice structure.

15. The article of footwear according to claim 1, wherein a diameter of the plurality of generally circular voids is generally consistent throughout the lattice structure.

16. The article of footwear according to claim 1, wherein struts of the plurality of non-linear struts are generally arcuate, curving outward and inward relative to a perimeter of the lattice structure.

17. The article of footwear according to claim 1, wherein:
    voids of the plurality of generally circular voids are full voids; and
    the lattice structure further comprises a truncated, semi-circular void.

18. The article of footwear according to claim 1, wherein the lattice structure further comprises a hollow strut defining an internal cavity.

19. The article of footwear according to claim 18 further comprising microparticles housed within the internal cavity of the hollow strut.

* * * * *